Dec. 22, 1942.      B. G. CARLSON      2,305,841
QUICK DISCONNECT COUPLING WITH FLOW CHECK
Filed March 6, 1941
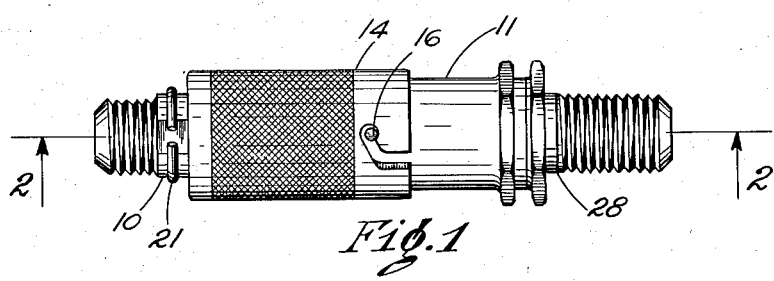
Fig. 1
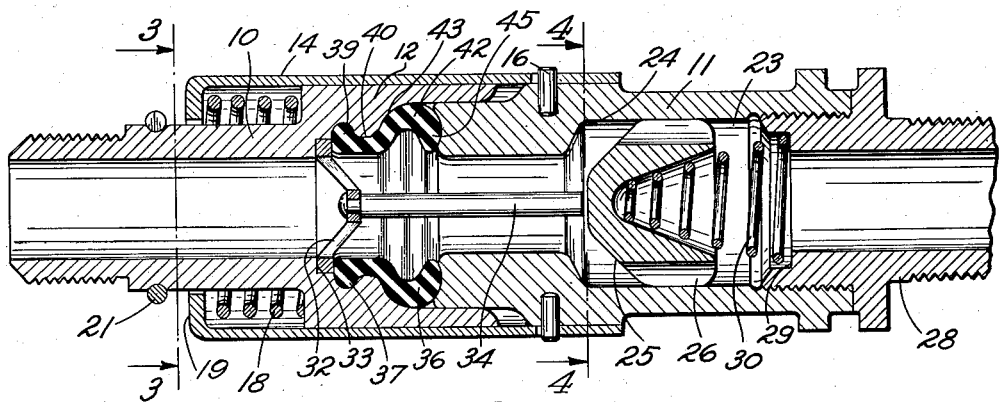
Fig. 2
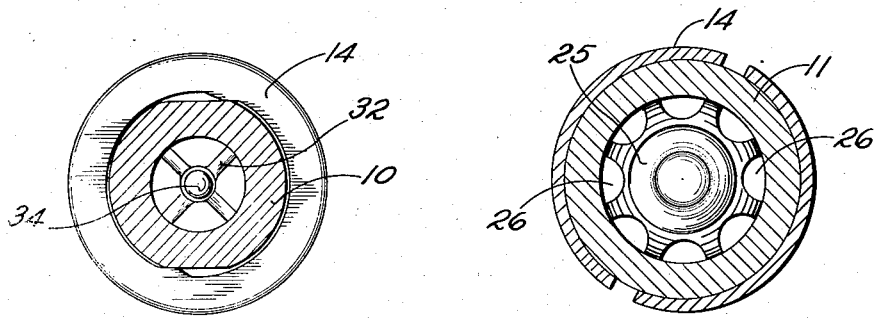
Fig. 3
Fig. 4
INVENTOR.
BERT G. CARLSON
BY Ricky & Watts
ATTORNEYS Patented Dec. 22, 1942

2,305,841

UNITED STATES PATENT OFFICE 2,305,841

QUICK DISCONNECT COUPLING WITH FLOW CHECK

Bert G. Carlson, Willobee, Ohio, assignor to The Weatherhead Company, Cleveland, Ohio, a corporation of Ohio Application March 6, 1941, Serial No. 382,044

6 Claims. (Cl. 284—19)

This invention relates broadly to a hose coupling and more specifically to improvements in a quick disconnect coupling of the type adapted to prevent the escape of fluid upon the separation of the coupling sections.

Heretofore certain efforts have been directed to the construction of couplings of the quick disconnect type having a valve or closure member disposed within one portion of the coupling for preventing the escape of fluid therefrom when the coupling members were separated. However, when the coupling members were united so as to unseat the valve and permit fluid to flow therethrough the connection between the members was such that fluid would leak therebetween. In a number of instances a sealing element, such as a washer, was interposed between the engaging surfaces of the coupling members to prevent the leakage of fluid thereby, however the arrangement and positioning of the sealing member was such that the fluid, which was forced through the coupling under high pressure, soon distorted the seal to the extent that the coupling would develop a leak.

One of the objects of the present invention is the provision of a hose coupling having a resilient sealing element disposed in one of the coupling members and adapted to cooperate with the other coupling member to prevent the leakage of fluid therebetween. Another object is to provide a hose coupling designed so that a fluid under line pressure forced through the coupling will assist in retaining the sealing element in engagement with the coupling members. A further object is to provide a simple and compact coupling embodying a sealing element for the coupling members. Still further objects are to provide such a coupling which is light in weight, economical of manufacture, reliable and efficient in service and which is susceptible of ready assembly or seperation with a minimum of physical effort.

I preferably accomplish the above and other objects of the invention by providing a hose coupling having a resilient expansible sealing element positioned within one of the coupling members and engageable with the other coupling member which is slidably urged within the first member for sealing the joint between the members and preventing the leakage of fluid therefrom. Preferably the sealing element is expanded by the pressure of the fluid flowing through the coupling members to insure a positive seal therebetween.

In the drawing Fig. 1 is a plan view of a preferred form of my coupling in its assembled form;

Fig. 2 is an enlarged longitudinal sectional view of the coupling, the view being taken on a plane indicated by line 2—2 of Fig. 1;

Fig. 3 is a transverse sectional view of the coupling, the view being taken on a plane indicated by line 3—3 of Fig. 2;

Fig. 4 is a transverse sectional view of the coupling showing the passages through the spring actuated valve, the view being taken on a plane indicated by line 4—4 of Fig. 2.

Referring to Fig. 1, the coupling shown therein for the purpose of illustration, comprises, two coaxial cylindrical members 10 and 11 with the member 10 having an enlarged head 12 formed on one end thereof for the reception of one end of the member 11. A sleeve 14 having a knurled outer surface is slidably mounted upon the enlarged head 12 with the forward and rearward ends thereof extending beyond the head. The forward end of the sleeve has camming slots formed therein engageable with radially projecting pins 16 affixed on the external surface of the member 11 for joining the members of the coupling. A compression spring 18 encircles the member 10 and is interposed between the head 12 and an inturned flange 19 formed on the rearward end of the sleeve 14. The inner edge of the flange has diametrically disposed projections thereon which are engageable with flat surfaces formed on the periphery of the member 10 to limit the rotative movement of the sleeve. A snap ring 21 is mounted in an annular groove formed on the external surface of the member 10 rearwardly of the inturned flange 19 for limiting the rearward movement of the spring-actuated sleeve 14.

The member 11 has a chamber 23 therein with a valve seat 24 formed at the inner end thereof for the reception of a valve 25 which has a plurality of openings 26 therethrough adjacent its peripheral edge. The outer end of the chamber 23 is threaded internally for the reception of a pipe or nipple 28 which has the outer surface thereof serrated for the reception of a hose extending from a fluid source of supply, not shown. Interposed between the valve 25 and a ledge 29 formed on the inner end of the nipple 28 there is a spring 30 for urging the valve towards its seat 24 to prevent the flow of fluid through the member 11 when the coupling members are separated.

A spider 32 is mounted upon a ledge 33 formed within the head 12 and has a rod 34 affixed thereto which is adapted to engage and unseat the valve 25 upon the coupling or joining of the members 10 and 11. A resilient sealing element 36, formed preferably of rubber, either natural or synthetic, has one end thereof supported on the spider with the opposite end thereof shaped for intimate engagement with the outwardly flared mouth of the head 12. The end of the resilient element engageable with the spider 32 is provided with an external bead 37 which is disposed within an annular recess formed in the head and spaced from the ledge 33 by a distance substantially equal to the thickness of the spider. Thus the end of the sealing element 36 retains the spider in the head 12 when the coupling members are separated. Adjacent the bead the member 36 is provided with a cylindrical portion 39 which coincides with the cylindrical portion 40 of the enlarged head 12 then with an outwardly flared, generally spherical portion 42 which coincides with the generally spherical surface 43 of the head 12, and terminates in an inturned lip 45 which is adapted to be compressed against the end of the member 11 when the coupling is assembled.

In the use of the coupling the inner end of the member 11 is telescoped within the outwardly flared mouth of the head 12, the external surface of the member 11 fitting closely within the inner surface of the head. As the member 11 is inserted within the head 12 the slots formed in the sleeve 14 are disposed in aligned relation with the pins 16 so that upon engagement of the member 11 with the resilient element 36 the sleeve 14 may be first urged forward against the compressive action of the spring 18 and then rotated slightly to secure the pins in the slots and thus lock the members 10 and 11 together. Upon the insertion of the member 11 within the head 12 the rod 34 affixed to the spider 32 engages the valve 25 and urges it rearwardly, compressing the spring 30 against the ledge 29, which action enables a fluid to flow through the coupling.

With the pins 16 disposed in the camming slots formed in the sleeve 14 the spring 18, interposed between the head 12 and the inturned flange 19, continuously urges the sleeve away from the pins so that the end of the member 11 is compressed against the lip 45 of the resilient sealing element 36 to provide a fluid tight seal between the members 10 and 11. The resilient element is also urged against a portion of the outwardly flared mouth of the head 12 by the inward movement of the member 11. The portion 42 of the resilient element is urged against the surface 43 of the head 12 as the end of the member 11 is compressed against the lip 45 to effect a fluid tight seal between the members. Furthermore, the fluid, which flows through the coupling under a high pressure, engages the resilient element rearwardly of the lip 45 for expanding the resilient element against the end of the member 11 and also against the inner surface of the head 12 to insure a leakproof joint between the two members. The pressure of the fluid acting against the inner surface of the resilient element tends to expand the resilient element in all directions, so that for any slight variations in distance that may occur between the end of the member 11 and the surface 43 of the head 12, due to the tension of the spring 18, the resilient element will be expanded a sufficient distance to compensate for said variation and thus provide a fluid tight seal for the coupling.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A coupling comprising a pair of coaxial cylindrical body members detachably connected together, one of said members having an enlarged head thereon, a spring actuated valve in said second member, a spider disposed in said head, a rod affixed thereto and adapted to unseat said valve upon the uniting of said members, a resilient element engaging said spider and retaining said spider in position and extending toward the open end of said head, a spring pressed sleeve slidably mounted on the head and having camming slots formed in an end thereof, the slotted end of said sleeve engageable with pins affixed upon the second member to continuously urge the second member into telescopic engagement with the head for compressing the resilient element between said member and spider to seal the coupling.

2. A coupling comprising a pair of coaxial cylindrical body members detachably connected together, one of said members having an enlarged head thereon, a spring actuated valve in said second member, a spider disposed in said head, a rod affixed thereto and adapted to unseat said valve upon the uniting of said members, a resilient element engaging said spider and retaining said spider in position and engaging the inner surface of said head, the free end of said resilient element terminating rearwardly of the open end of said head and provided with an inturned lip thereon, a spring pressed sleeve slidably mounted on the head, one end of said sleeve engageable with said second member for urging the second member into a close fitting engagement with the inner surface of said head, the end portion of said second member engaging said lip for expanding said resilient element against the inner surface of the head to provide a fluid tight seal at the joint of said body members.

3. A coupling comprising two coupling members, one of said members having an enlarged head thereon for the reception of one end of the second member, a spring actuated valve in said second member, a spider supported on a ledge within said head, a rod on the spider abutting said valve for unseating the valve simultaneously with the uniting of said members, a resilient element interposed between said spider and said end of the second member, an external bead on the spider engaging end of said resilient element disposed within an internal annular recess formed in said head for retaining the spider in said head upon the separation of said body members, and means for detachably securing said members together.

4. A coupling comprising a pair of coupling members, the first of said members having a head terminating in an open ended cylindrical portion, the second member having an internal bore, an external cylindrical end portion fitting closely within the cylindrical portion of the bore of said first member, and an annular end surface, the bore of said first member being reduced adjacent the cylindrical portion thereof and then being recessed, a resilient sealing member having a bead engaging the recessed portion of said bore, an intermediate portion engaging the reduced portion of said bore, an enlarged portion engaging the cylindrical portion thereof and an inturned annular portion engaging the end surface of said second member, and means for securing said members together.

5. A coupling comprising a pair of coupling members, the first of said members having an enlarged head thereon with a bore terminating in an open ended cylindrical portion, the second member having an internal bore, an external cylindrical end portion fitting closely within the cylindrical portion of said first member, and an annular end surface, the bore of said first member being reduced adjacent the cylindrical portion thereof and then being recessed, a resilient sealing member having a bead engaging the recessed portion of said bore, an intermediate portion engaging the reduced portion of said bore, an enlarged portion engaging the cylindrical portion thereof and an inturned annular portion engaging the end surface of said second member, and means for securing said members together comprising a spring pressed sleeve slidably mounted on the head of said first member and engageable with the second member.

6. A coupling having a bore terminating in an open ended cylindrical portion and having a reduced portion adjacent the cylindrical portion thereof and a recess adjacent the reduced portion, a resilient sealing member having a bead fitting the recessed portion of said bore, an intermediate portion engaging the reduced portion of said bore, an enlarged portion engaging the cylindrical portion and an inturned annular end portion.

BERT G. CARLSON.